Aug. 24, 1954   J. P. K. FONTAINE   2,687,224
DUMP TRUCK BODY

Filed Oct. 18, 1950   2 Sheets-Sheet 1

INVENTOR.
JOHN P. K. FONTAINE
BY Jennings & Carter
ATTORNEYS

Aug. 24, 1954      J. P. K. FONTAINE      2,687,224
DUMP TRUCK BODY
Filed Oct. 18, 1950      2 Sheets-Sheet 2
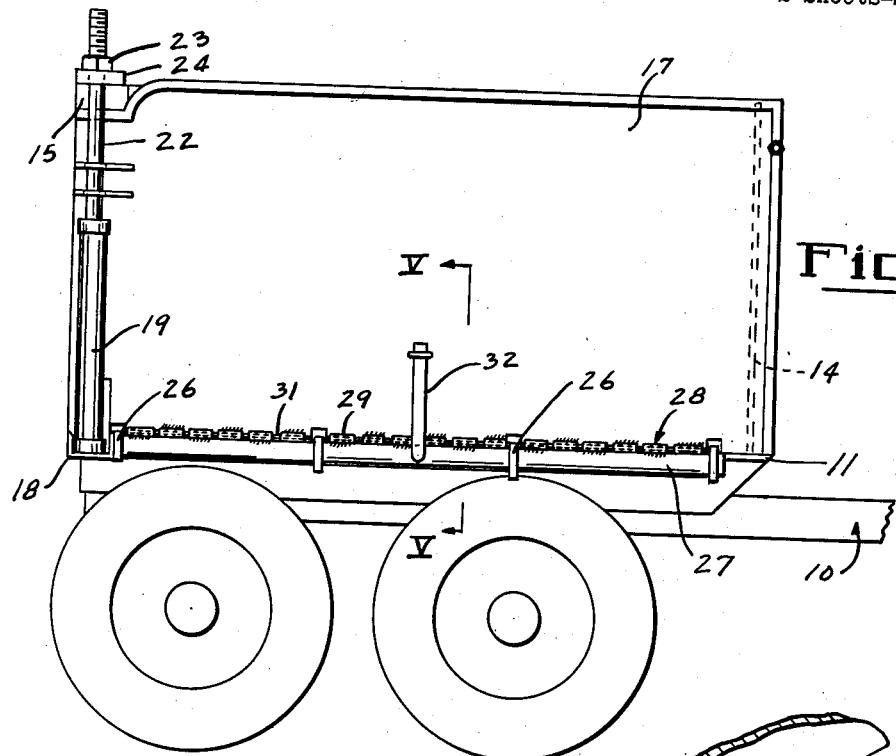
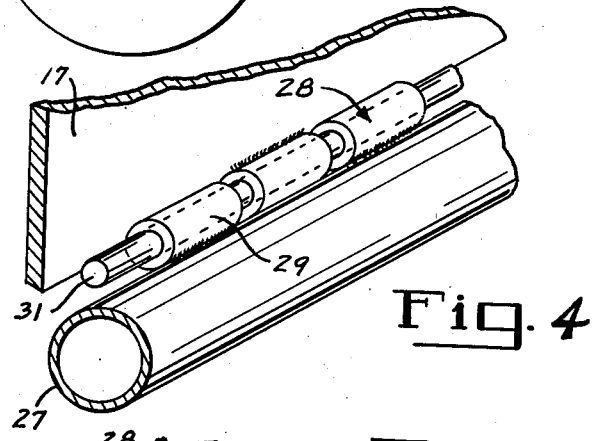
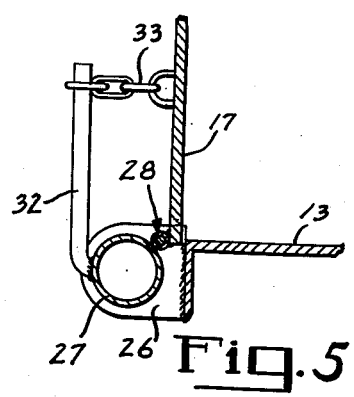
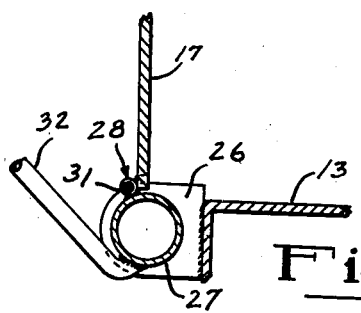
INVENTOR.
JOHN P. K. FONTAINE
BY
ATTORNEYS Patented Aug. 24, 1954

2,687,224

UNITED STATES PATENT OFFICE 2,687,224

DUMP TRUCK BODY

John P. K. Fontaine, Birmingham, Ala.

Application October 18, 1950, Serial No. 190,861

3 Claims. (Cl. 214—147)

This invention relates to a dump truck body for hauling substantially rectangular articles such as bricks, blocks, boxes or the like and has for an object the provision of means for clamping and holding the articles against shifting during loading, unloading and while in transit.

A more specific object of my invention is to provide a hinged connection between the lower edge of the sides of the body and a member mounted for rotation adjacent the side edges of the bottom.

Briefly my invention comprises providing a shiftable dump truck body which is rotatable from a horizontal or carrying position to a vertical loading and unloading position. The body is open at the top and rear and is provided with clamping means adjacent the rear of the body for holding the articles in the body against shifting. Secured to the bottom adjacent the side edges thereof is a rotatable member which is hingedly connected to the lower edge of the sides of the body. When the rotatable member is rotated in one direction the sides of the body are moved outwardly and when rotated in the opposite direction the sides are moved inwardly to engage and hold the articles in the body against shifting.

These and other features of my invention are illustrated in the accompanying drawings forming a part of this application in which:

Fig. 3 is an elevational view of my improved dump body on a truck in loaded position;

Fig. 4 is a perspective view of the hinge employed to pivotally connect the sides to the bottom of the body;

Fig. 5 is a sectional view taken along the line V—V of Fig. 3 showing the sides in closed position;

Fig. 6 is a view similar to Fig. 5 showing the sides moved to open position;

Fig. 7 shows a modified form of my invention with pressure operated means for rotating the elongated tubular member.

Figure 1:
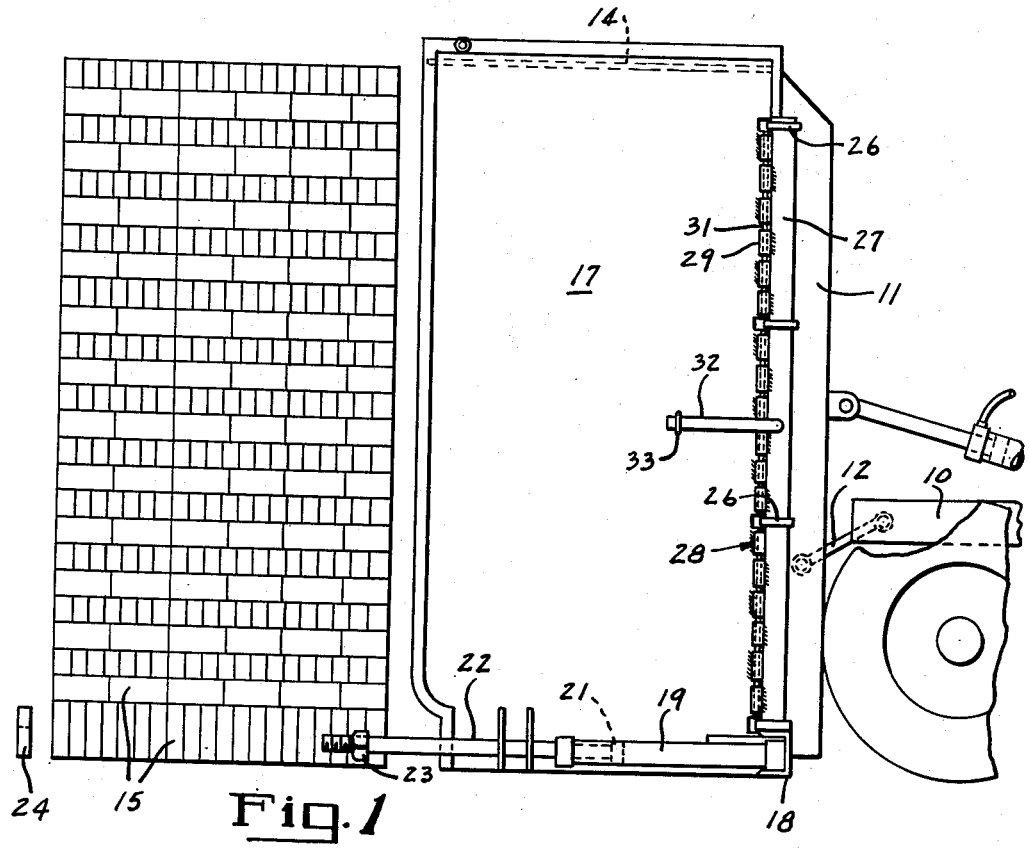
Fig. 1 is a side elevational view of a shiftable dump truck body embodying my improved retaining mechanism in position to engage a stack of rectangular articles.

Referring now to the drawing for a better understanding of my invention, I show in Fig. 1 a fragment 10 of a truck having a shiftable dump body 11 hingedly connected thereto by means of a hinge plate 12 and which is movable from a horizontal or carrying position to a vertical loading and unloading position, for example as shown in Robert A. Fontaine Patent No. 1,866,640, dated July 12, 1932. The dump body 11 has a bottom 13 and a closed forward end 14 but is open at the top and rear, or lower end. The body is provided with sides 16 and 17 which are adapted to move transversely and engage the articles 15 in the body and hold the same against shifting, as will be described hereinafter.

Figure 2:
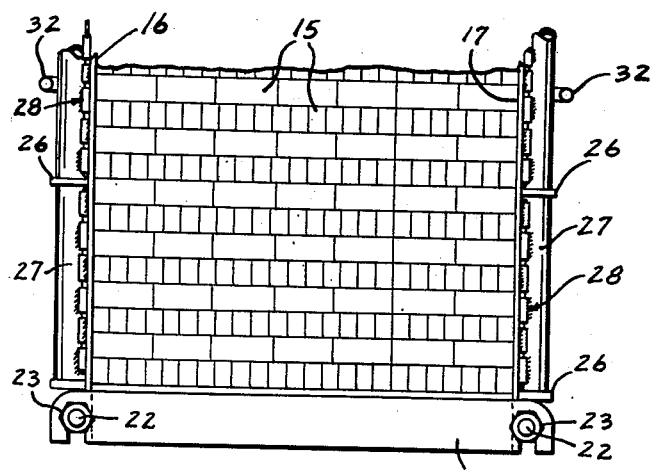
Fig. 2 is a plan view of the rear portion of the body in loaded position.

At the rear of the body adjacent the bottom thereof is a cross beam 18. Secured to the cross beam adjacent each end thereof is a vertically extending pressure operated cylinder 19 having a piston 21 and a piston rod 22. The upper portion of the piston rod 22 is threaded to receive a nut 23. Extending across the rear of the body adjacent the top thereof and substantially parallel to the cross beam 18 is a clamping bar 24 adapted to be engaged and retained by the nuts 23 as shown in Fig. 2. When the piston rod 22 is moved downwardly the rear or bottom course of rectangular articles are firmly held against shifting.

Secured to the side edges of the bottom 13 are a plurality of brackets 26 having an opening therethrough to slidably receive an elongated tubular member 27 which extends substantially the length of the sides of the body. Each of the sides 16 and 17 is pivotally connected adjacent the lower edge thereof to the adjacent tubular member 27 by means of a piano hinge 28. The piano hinge may be formed by placing a plurality of tubular members 29 between the lower edge of the sides 16 and 17 and the adjacent tubular member 27. Alternate ones of the tubular members 29 are welded to the elongated tubular member 27 and the others are welded to the lower edge of the side 16 or 17 as the case may be. A rod 31 is then inserted through the tubular members 29 to hold them in assembled position.

Secured to the elongated tubular member 27, preferably adjacent the center thereof, is a lever 32 for rotating the member 27. The lever is so positioned on the tubular member 27 that when the lever is moved upwardly to a substantially vertical position, the side of the body is moved inwardly to closed position, as shown in Fig. 5. When the lever is moved downwardly, as shown in Fig. 6, the side of the body is moved outwardly to open position. To hold the lever in the closed position, one end of a link chain 33 is secured to the side of the body. When the lever 32 is moved to vertical or closed position a link of the chain 33 is slipped over the upper portion of the lever thus retaining the lever in a vertical position.

From the foregoing description, the operation of my improved dump truck body will be readily understood. In loading a stack of rectangular articles, such as bricks, the clamping member 24 is removed. The lever 32 is then moved downwardly thereby rotating the hinge 28 and the side connected thereto outwardly to open position, as shown in Fig. 6. The body 11 is next moved to the vertical or loading position in a manner well understood and is moved rearwardly so as to place the stack of rectangular articles wholly within the confines of the body. The sides 16 and 17 are then moved to closed position by moving the lever 32 upwardly to a vertical position. A link of the chain 33 is then placed over the upper portion of the lever thus holding the sides in closed position. When the sides are moved inwardly to closed position the articles within the body are firmly held against shifting.

After securing the sides in closed position, the clamping member 24 is placed over the bottom course of articles 15 and is moved downwardly by means of the piston rod 22. The body is then moved to horizontal or carrying position.

Referring to Fig. 7, I show a modified form of my invention whereby the elongated bar 27 is rotated by means of a pressure cylinder 34 having a piston rod 36 which is operably connected to the tubular member 27 through a link 37.

While I have shown my invention in but two forms, it will be obvious to those skilled in the art that it is not so limited, but is susceptible of various other changes and modifications without departing from the spirit thereof, and I desire therefore, that only such limitations shall be placed thereupon as are specifically set forth in the appended claims.

What I claim is:

1. In a dump truck body for hauling substantially rectangular articles including a bottom and substantially parallel sides, said body being open at the top and rear and movable from a horizontal carrying position to a vertical loading and unloading position, a plurality of brackets secured to the side edges of the bottom, each bracket having a longitudinally extending opening therethrough, elongated tubular members extending substantially parallel to said side edges and rotatably mounted in said brackets, a piano hinge connecting said elongated member to the lower edge of the sides of the body, a lever secured to the rotatable member for rotating the same, means to hold the lever in closed position and clamping means engaging the bottom course of articles when said body is in said vertical loading and unloading position and holding the same against shifting.

2. In a dump truck body as defined in claim 1 in which the means to hold the lever in closed position comprises a link chain secured at one end to the side of the body and having a link at the opposite end thereof disposed to fit over the upper portion of the lever.

3. In a dump truck body for hauling substantially rectangular articles including a bottom and substantially parallel sides, said body being open at the top and rear and movable from a horizontal carrying position to a vertical loading and unloading position, the improvement comprising elongated members mounted for rotation in fixed bearings adjacent the side edges of the bottom and extending substantially parallel to said side edges, a piano hinge connecting each rotatable member to the lower edge of the adjacent side of the body, means to rotate the rotatable members and thereby move the sides inwardly to engage articles in the body, and clamping means engaging the bottom course of articles when the body is in said vertical loading and unloading position and holding the same against shifting.

References Cited in the file of this patent

UNITED STATES PATENTS

| Number | Name | Date |
| --- | --- | --- |
| 1,099,847 | Doble et al. | June 9, 1914 |
| 1,371,392 | Penfield | Mar. 15, 1921 |
| 2,308,648 | De Vry et al. | Jan. 19, 1943 |
| 2,379,254 | Rathbun | June 26, 1945 |
| 2,458,799 | Sattler | Jan. 11, 1949 |
| 2,468,999 | Pettler | May 3, 1949 |
| 2,491,805 | Fontaine | Dec. 20, 1949 |
| 2,552,627 | Fontaine | May 15, 1951 |